(12) United States Patent
Ingo

(10) Patent No.: US 6,950,575 B2
(45) Date of Patent: Sep. 27, 2005

(54) OPTICAL MODULE AND A METHOD FOR MANUFACTURING AN OPTICAL MODULE

(75) Inventor: Karla Ingo, Schermbeck (DE)

(73) Assignee: Avanex Corporation, Fremont, CA (US)

( * ) Notice: Subject to any disclaimer, the term of this patent is extended or adjusted under 35 U.S.C. 154(b) by 89 days.

(21) Appl. No.: 10/463,596

(22) Filed: Jun. 18, 2003

(65) Prior Publication Data

US 2004/0057679 A1 Mar. 25, 2004

(30) Foreign Application Priority Data

Jun. 19, 2002 (EP) .......................................... 02360181

(51) Int. Cl.$^7$ ................................................ G02B 6/32
(52) U.S. Cl. .............................. 385/33; 385/31; 385/91; 385/132
(58) Field of Search ..................... 385/90–94, 129–132, 385/31, 33–35; 216/34, 35; 438/745

(56) References Cited

U.S. PATENT DOCUMENTS

| | | | |
|---|---|---|---|
| 5,124,281 A | 6/1992 | Ackerman et al. | |
| 5,178,319 A | 1/1993 | Coucoulas | |
| 5,933,707 A | 8/1999 | Ayliffe et al. | |
| 6,117,794 A | * 9/2000 | Dormer et al. | ............. 438/745 |
| 6,119,921 A | * 9/2000 | Brady et al. | ............. 228/124.1 |
| 6,265,240 B1 | * 7/2001 | Dautartas et al. | ............. 438/55 |

* cited by examiner

*Primary Examiner*—Fayez G. Assaf
(74) *Attorney, Agent, or Firm*—Moser, Patterson & Sheridan

(57) ABSTRACT

The invention is a method for manufacturing an optical module where on forms a groove in a substrate for positioning a component such as an optical component. The optical component is provided to be bonded into the groove by a aluminum oxide bonding process. To prepare the bonding an aluminum layer is deposited on the optical component followed by a protection layer.

16 Claims, 5 Drawing Sheets

OPTICAL MODULE AND A METHOD FOR MANUFACTURING AN OPTICAL MODULE

FIELD OF INVENTION

The present invention relates to the field of fabrication of optical modules on a substrate and more particularly to the usage of an aluminum oxide bonding process for bonding of optical components to the substrate.

BACKGROUND OF THE INVENTION

It is known from the prior art to use an epoxy glue to affix a ball lens of an optical submount. Usage of epoxy glue has several disadvantages:
   The epoxy glue is aging and has a poor long term reliability.
   The stability of the epoxy glue is strongly degreasing at higher temperatures.
   The process of glueing a ball lens by means of epoxy glue is both time consuming and expensive as it is difficult to apply a tiny quantity of epoxy glue below the ball lens.
   The position of the ball lens is defined with a greater tolerance in comparison to the tolerance which is achievable by anorganic attachment. This is because substantial quantity of epoxy glue is required for glueing the ball lens which creates a greater tolerant with respect to the exact position.

As far as anorganic attachment is concerned it is also known from the prior art to utilizes an aluminum oxide bonding process: U.S. Pat. No. 5,178,319 shows compression bonding method for permanently bonding elements such as glass spheres and optical fibers to aluminum surfaces of substrates by applying pressure along with energy to the interface of the element and the aluminum. For example the glass sphere is bonded by pressing it against aluminum while heating the aluminum. As an alternative to heating acoustic energy can be applied to the sphere along with the pressure. Glass optical fibers can be bonded to aluminum surfaces in the same manner.

The publication "Aluminum oxide bonding—a method for joining oxide optical components to aluminum coated substrates", Coucoulas et al., 1993 IEEE Conference proceedings, shows a similar method. This process requires that an aluminum layer is deposited in an processing step when the substrate is structured. Thus the aluminum layer is exposed to several aggressive processing steps such as exposure to acids, reflow at temperature around 300° C. etc. Such processing steps deteriorate the quality of the aluminum surface. This is a substantial problem, as the aluminum oxide bonding technique requires a contact between oxide such as silicium oxide and pure non-oxidized aluminum. As a consequence the quality of the aluminum oxide bond form the between the ball lens and the substrate is decreased because of such process steps to which the aluminum layer is subjected.

U.S. Pat. No. 5,124,281 describes a method for making a V groove such that a spherical lens can be precisely located within it. A laser is mounted on a planar surface of a mono crystalline silicon mounting member. A spherical lens is mounted in a mono crystalline silicon cover member which when adopted and registered to the mounting member aligns the spherical lens with the laser so that the output light can be projected along a precise predetermined path. The spherical lens is mounted in a V shaped groove which is made in the cover member by masking and etching. A second V shaped groove intersects the first groove and defines a V shaped edge in one site of the first groove. The spherical lens is than sited in the first V shaped groove such that it bears against two points of the V shaped edge and against one site wall of the first V shaped groove. The second lens is mounted in the cover member in the same manner as the first lens and directs laser light from a rare facet of the laser to mirror and then to a photo detector mounted in the cover member.

From U.S. Pat. No. 5,933,707 a further method for crystal substrate processing is known. An anisotropic silicon etchant is used in a processing stage to form precision machined features in the substrate. Prior to the use of the etchant a masked layer of organic dielectric is applied to the substrate. The dielectric protects surface features previously defined. By etching the I/Os in the final passivation prior to the deposition of solder the application of the organic dielectric protective layer and the aching of the V grooves the agent is prevented from accessing the opened I/O and the number and complexity of the patterning stages is thereby reduces.

From a technologic point of view it is preferable to change from glueing to an anorganic attachment but using the anorganic attachment with aluminum oxide and aluminum the results are not reliable. Checking the fixation with share tests the damaged pattern shows two characteristics:
   First no bonding at all took place when the aluminum was already oxidized prior the actual bonding took place.
   Second where the bonding took place the crack seems to appear within the aluminum layer. It seems that if the weak materials strength of the weak pure aluminum is one limiting factor of fixation.

SUMMARY OF THE INVENTION

The present invention provides for improved method for manufacturing an optical module as claimed in the independent claims. Preferred embodiments of the invention are set forth in the dependent claims. It is a particular advantage of the present invention that the deposition of an aluminum layer is followed by the deposition of a protection layer. This protection layer avoids or and minimized the oxidation and reoxidation process of the pure aluminum surface. Further the invention has the advantage that the use of a doped aluminum increase the reachable strength of the fixation between optical component and substrate by the material stability of the doped aluminum layer.

BRIEF DESCRIPTION OF THE DRAWINGS

In the following preferred embodiments of the invention will be described in greater detail by making reference to the drawings in which
FIG. 1 shows an optical module 1 comprising a silicon substrate 2 and an optical component such as a ball lens 3. The ball lens 3 has an optical access for. An oxide layer 5 is deposited on the surface of the ball lens 3. Typically the oxide layer 5 is formed by silicon oxide. To prepare the place on the substrate where the ball lens should be fixed, a groove is formed in the silicon substrate 2 having walls 6 and 7. Preferably the groove is formed by anisotropically etching the silicon substrate 2 such that the walls 6 and 7 have a defined inclination angle such that the position of the ball lens 3 within the groove is accurately determined. This is especially important for exactly positioning the optical access. In order to fix the ball lens 3 to the silicon substrate 2 in its positioned defined by the walls 6 and 7 the ball lens 3 is placed within the groove formed by the walls 6 and 7.

The ball lens 3 is partly coated with an aluminum layer 8 and a protection layer 14 letting the optical path free. This two layers cover only that part of the ball lens, that is important for the fixation of the lens.

Figure 1:
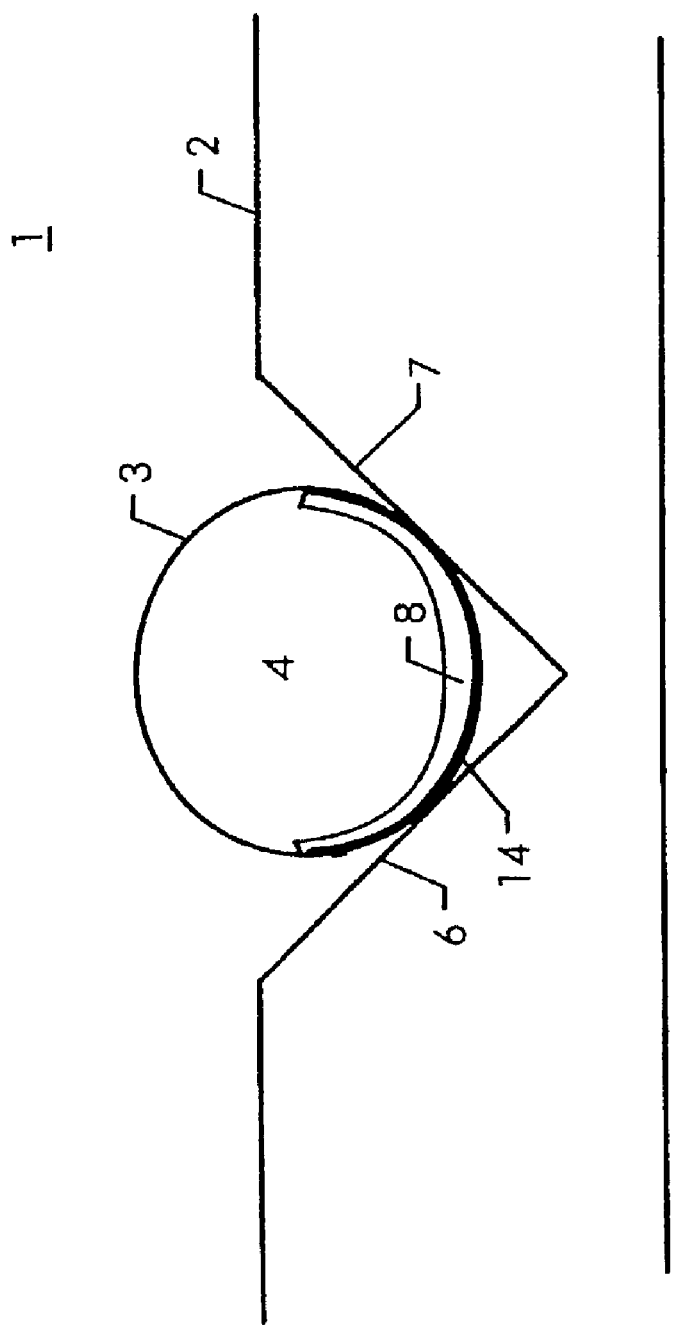
FIG. 1 is a side sectional view of a first embodiment of an optical module in accordance with the invention
Figure 2:
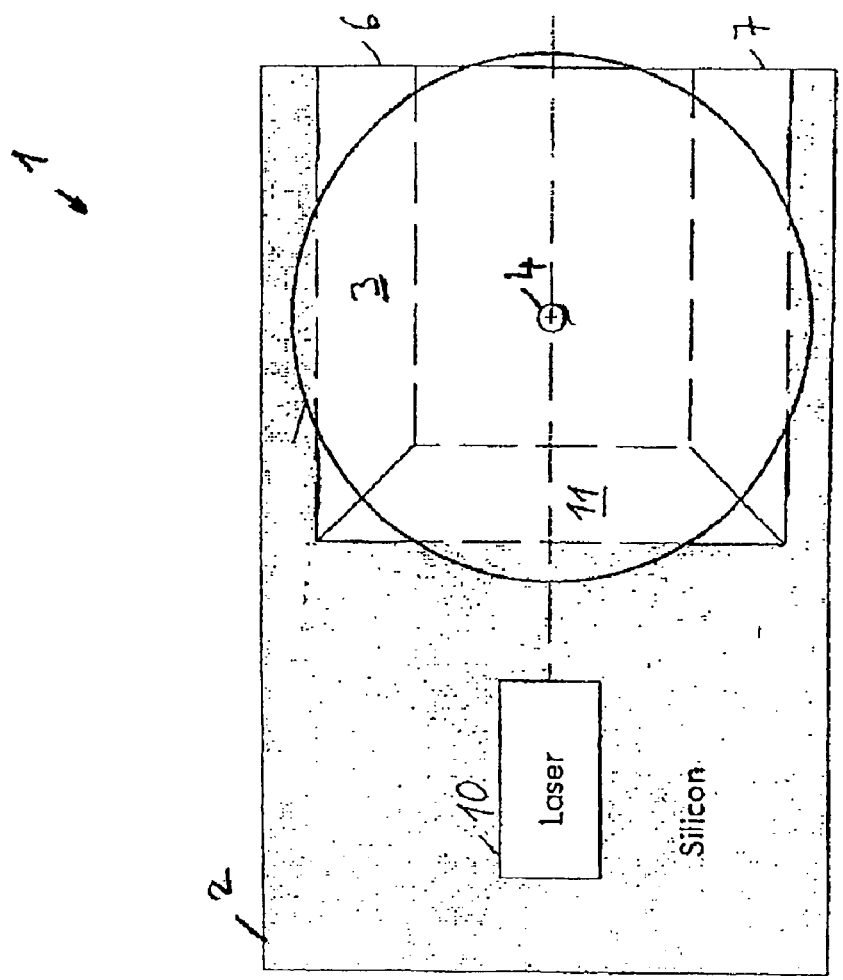
FIG. 2 is a top view of the optical module of FIG. 1

FIG. 2 shows a top view of the optical module 1. The optical module 1 has a laser 10. The ball lens 3 is placed within the groove formed by the walls 6 and 7 and is affixed to the silicon substrate 2 of the optical module. In the horizontal direction the ball lens 3 is positioned with respect to the wall 11 formed between the walls 6 and 7. This way the optical access of the ball lens is in alignment with the laser 10.

Figure 3:
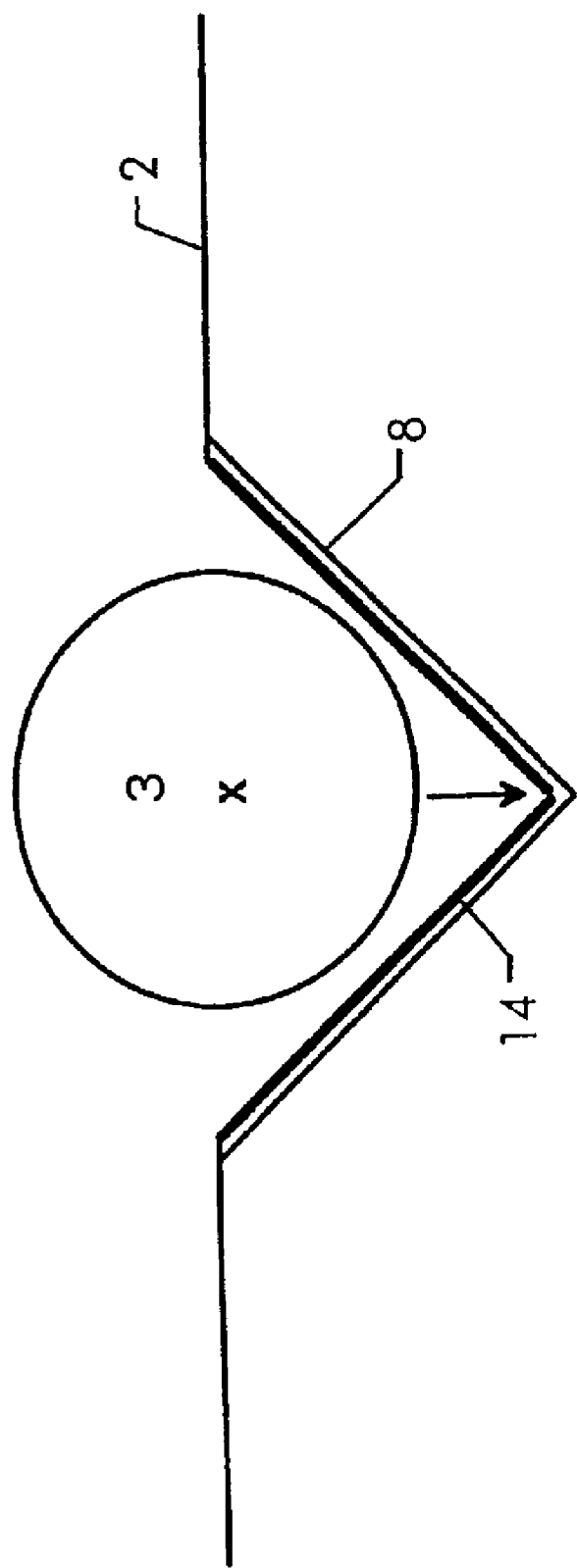
FIG. 3 is a side section of a second embodiment of the invention

FIG. 3 shows another embodiment of the invention. The walls of the V-groove are covered by aluminium layer 8. This aluminium layer is protected by a protection layer 14. The ball lens 3 has a $SiO_2$ layer. The invention describes an improvement of the known aluminum oxide bonding process where—in the embodiment of FIG. 3—the silicium oxide covered ball lens is attached by thermo compressive bonding in a aluminum covered V groove. Instead of using a pure elementary aluminum layer the aluminum is covered by a thin protection layer which is deposited in the some vacuum system directly after the aluminum deposition without breaking the vacuum. For example a sputtered 6,5 μm aluminum layer can be protected by a subsequently sputtered thin silicon layer about 20 nm thick. This ensures that the aluminum surface does not oxidize after taking the wafer out of the aluminum evaporation/sputtering equipment. Alternatively the protection layer could be applied after having removed the aluminum oxide from the aluminum layer surface.

For example an hydrogen plasma cleaning could be applied followed by a protection layer deposited in the same plasma chamber for example formed out of the methan plasma which then leads to an polymer protection layer. Silicon has a high diffusion coefficient in aluminum and thus the silicon form the protection layer diffuses away into the aluminum layer at the beginning of the bonding process. The component is heated to a temperature around 300 to 350° C. The ball lens is then attached by thermo compression bonding. Thereby the thickness of the covering aluminum oxide layer which needs to be cracked and pushed towards the side is related to the emerging quantity of pure non-oxidized aluminum which allows the bonding.

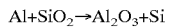

$$Al+SiO_2 \rightarrow Al_2O_3+Si$$

Obviously no reaction can take place where the aluminum is already oxidized before being in contact with the silicium oxide covered ball lens. The protection layers seems to reduce largely the amount of oxidation of the aluminum layer much more elementary non-oxidized aluminum can be brought in contact with the ball lens and thus a strong bonding process takes place. Although in the current example the silicium concentration can only lead to an aluminum silicium alloy with 0.3% silicium. This should already increase the material stability of the aluminum layer as pure aluminum is very soft while all kinds of aluminum alloys with for example magnesium silicium and others are considerably harder. By using a thin silicium protection layer on top of the thick aluminum layer the ball lens could be attached in a much stronger way. The required shear test forces increased by a factor of three in comparison to the best conventional pure aluminum bonding results and to more than an order of magnitude to the current average of all previous tests. However, it can only be said that the holding strength increase quite much.

Other kinds of protection layers are also possible for example some formed on the base of special polymers. Some are quite oxygen-proove and by varying their chain length their evaporation temperature can be adapted. The idea is that this protection layer evaporates so disappears during heating directly before the bonding process.

The examples above do not limit the scope of the invention. Every other form of the place on the substrate which will known by persons skilled in the art is suitable for the invention. As examples any kind of recess, as grooves V and U-shaped, cylindric or the plane substrate is a possible place for fixing the optical component.

The example of a ball lens does also not limit the scope of the invention to this device.

Figure 4:
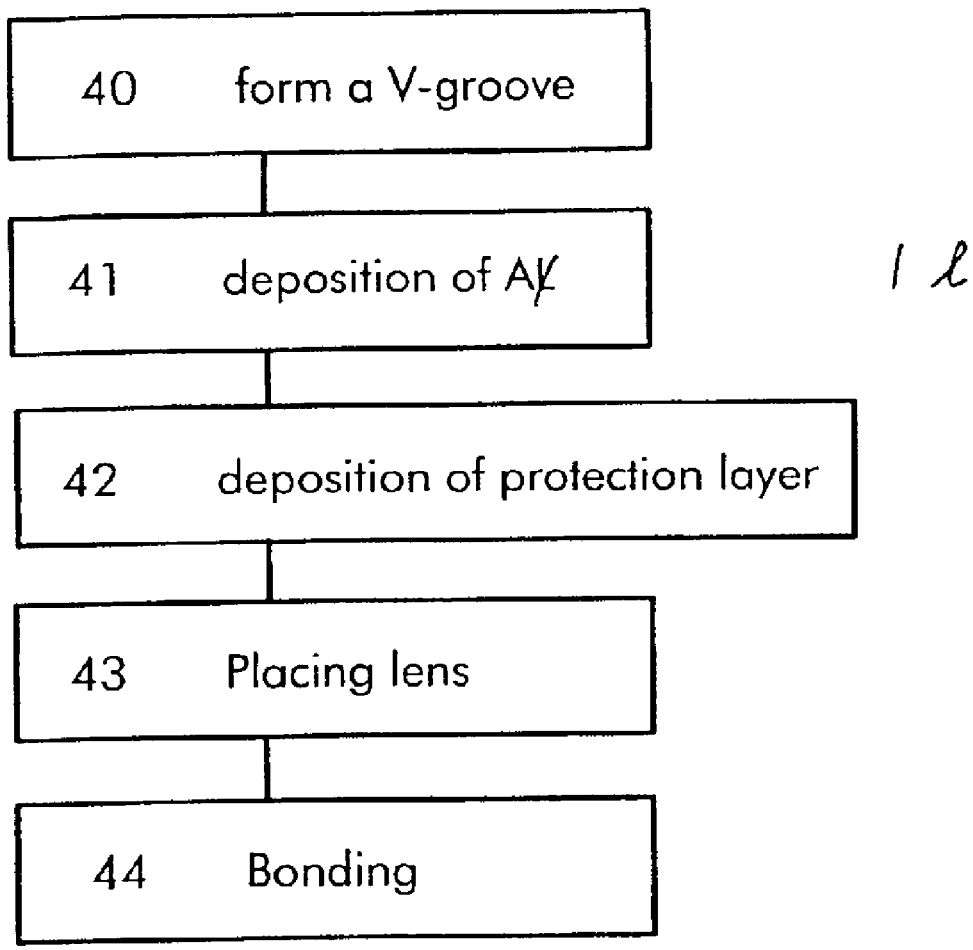
FIG. 4 is a schematic method for manufacturing an optical module
Figure 5:
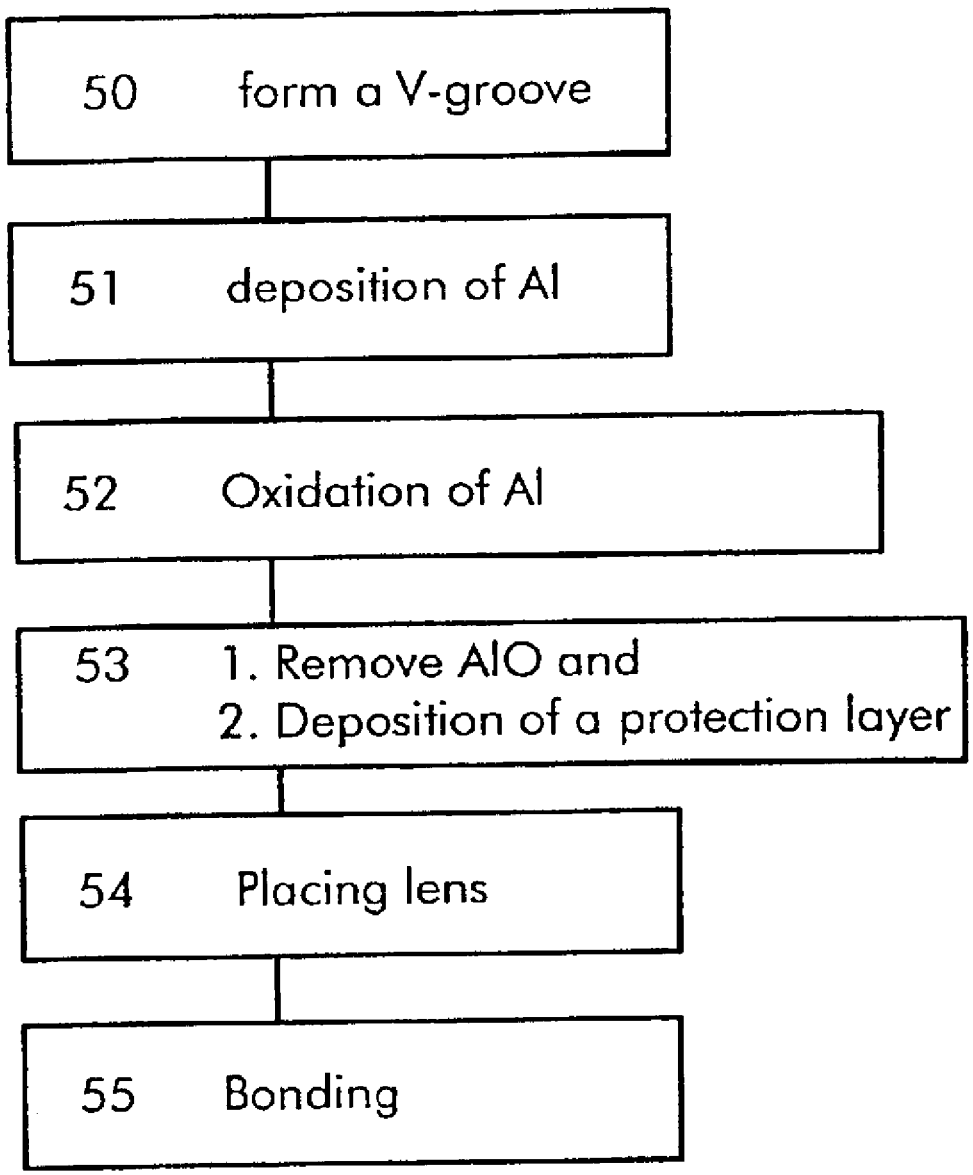
FIG. 5 is an alternative method for manufacturing an optical module

FIG. 4 is an illustrative of a corresponding manufacturing process. In step 40 a deep V groove is formed in the wafer. In step 41 an aluminum layer is deposited for example by means of vapour deposition or sputtering. In step 42 a protection layer is deposited over the aluminum layer. In step 43 an optical component such as a ball lens is place in the V groove. The ball lens can have an antireflective coating containing an outer oxide layer as silicium oxide. In Step 44 the bonding of the ball lens to the wafer is formed. During this process the aluminum layer is heated to increase the strength of the bonding and in cases of a vanishing protection layer to evaporate the protection layer.

Fig. is an illustrative of a alternative corresponding manufacturing process. In step 50 a deep V groove is formed in the wafer. In step 51 an aluminum layer is deposited for example by means of vapour deposition or sputtering. In step 52 the aluminium layer is oxidized during handling. In step 53 the aluminum oxide layer is removed and in step 53 the protection layer is applied on the aluminium layer. In step 54 an optical component such as a ball lens is place in the V groove. The ball lens can have an antireflective coating containing an outer oxide layer as silicium oxide. In step 55 the bonding of the ball lens to the wafer is formed. During this process the aluminum layer is heated to increase the strength of the bonding and in cases of a vanishing protection layer to evaporate the protection layer

What is claimed is:

1. A method for manufacturing an optical module comprising the steps:

providing a place on a substrate for positioning an optical component, providing the optical component, bonding the optical component to the groove by means of aluminum oxide bonding process, wherein the process is modified by forming an aluminum layer on the optical component, protecting the aluminum layer with a protection layer.

2. A method for manufacturing an optical module comprising the steps:

providing a place on a substrate for positioning an optical component, providing the optical component, bonding the optical component to the place by means of aluminum oxide bonding process, wherein the process is modified by forming an aluminum layer on the substrate, protecting the aluminum layer with a protection layer.

3. A method according to claim 2 where the optical component has a silicon oxide coating.

4. A method according to claim 2 where the aluminum layer is doped with at least one dopant.

5. A method according to claim 2 where the protection layer consists of silicon.

6. A method according to claim 2 where the protection layer consists of polymer.

7. A method according to claim 1 where the substrate has a silicon oxide coating at least at the fixation section.

8. A method according to claim 1 where the aluminium layer is doped with at least one dopant.

9. A method according to claim 1 where the protection layer consists of silicon.

10. A method according to claim 1 where the protection layer consists of polymer.

11. An optical module comprising, a substrate with a groove, an optical component being aluminum oxide bonded to a place on a substrate, an aluminum layer being formed on the optical component, a protection layer formed on the optical component and covering at least a portion of the aluminum layer to reduce the oxidation of the aluminum layer.

12. An optical module according to claim 11 where the protection layer consists of silicon.

13. An optical module according to claim 11 where the protection layer consists of a polymer.

14. An optical module comprising, a substrate with a groove, an optical component being aluminum oxide bonded to a place on a substrate, an aluminum layer being formed on the substrate, a protection layer formed on the the substrate and covering at least a portion of the aluminum layer to reduce the oxidation of the aluminum layer.

15. An optical module according to claim 14 where the protection layer consists of silicon.

16. An optical module according to claim 14 where the protection layer consists of a polymer.

* * * * *